United States Patent [19]

Hermann

[11] Patent Number: 4,629,920
[45] Date of Patent: Dec. 16, 1986

[54] ALTERNATING CURRENT SYNCHRONOUS SERVOMOTOR

[75] Inventor: Jaun Hermann, CH-8105, Switzerland

[73] Assignee: Mavilor Systéme SA, Fribourg, Switzerland

[21] Appl. No.: 740,906

[22] PCT Filed: Sep. 26, 1984

[86] PCT No.: PCT/CH84/00154
§ 371 Date: Jun. 27, 1985
§ 102(e) Date: Jun. 27, 1985

[87] PCT Pub. No.: WO85/01619
PCT Pub. Date: Apr. 11, 1985

[30] Foreign Application Priority Data
Oct. 3, 1983 [CH] Switzerland .......................... 5374/83

[51] Int. Cl.⁴ .............................................. H02K 21/12
[52] U.S. Cl. ................................... 310/156; 310/268; 310/271
[58] Field of Search ............................. 310/152-165, 310/271, 260-270

[56] References Cited

U.S. PATENT DOCUMENTS

| | | | |
|---|---|---|---|
| 3,121,814 | 2/1964 | Kober | 310/156 |
| 3,320,453 | 5/1967 | Kober | 310/156 X |
| 3,553,510 | 1/1971 | Howey | 310/271 |
| 4,433,261 | 2/1984 | Nashiki et al. | 310/271 X |
| 4,578,610 | 3/1986 | Kliman | 310/268 X |

Primary Examiner—Donovan F. Duggan
Attorney, Agent, or Firm—Watson, Cole, Grindle & Watson

[57] ABSTRACT

In an alternating current synchronous servomotor, a disk-shaped rotor (20) is arranged between two stator halves having each a coil with leads extending in the radial direction. The rotor (20) comprises an even number of flat permanent magnets (57) forming an annular series around a hub (55) and of which the flat sides form the north and south poles (N,S) alternating in the series. The circonference of the hub (55) presents planar surfaces (55A) separated by edges (55B). A planar delimitation surface (57A) of one of the permanent magnets (57) bears on each of said peripheral surfaces (55A). A bandage (66) surrounding the delimitation surfaces (57B) of all the permanent magnets (57), which are radially directed to the outside, secures the latter to the hub (55) and connects them by means of the planar surfaces (55A, 57A), mechanically to the hub against rotation. The permanent magnets (57) close to the delimitation surfaces (57C, 57D) facing them are in mutual contact at the edges (55B) of the hub, but diverge towards the outer circonference of the rotor (20). Thereby, a good utilization of magnetic flux, as well as a reduction of the rotor reluctance are achieved.

11 Claims, 9 Drawing Figures

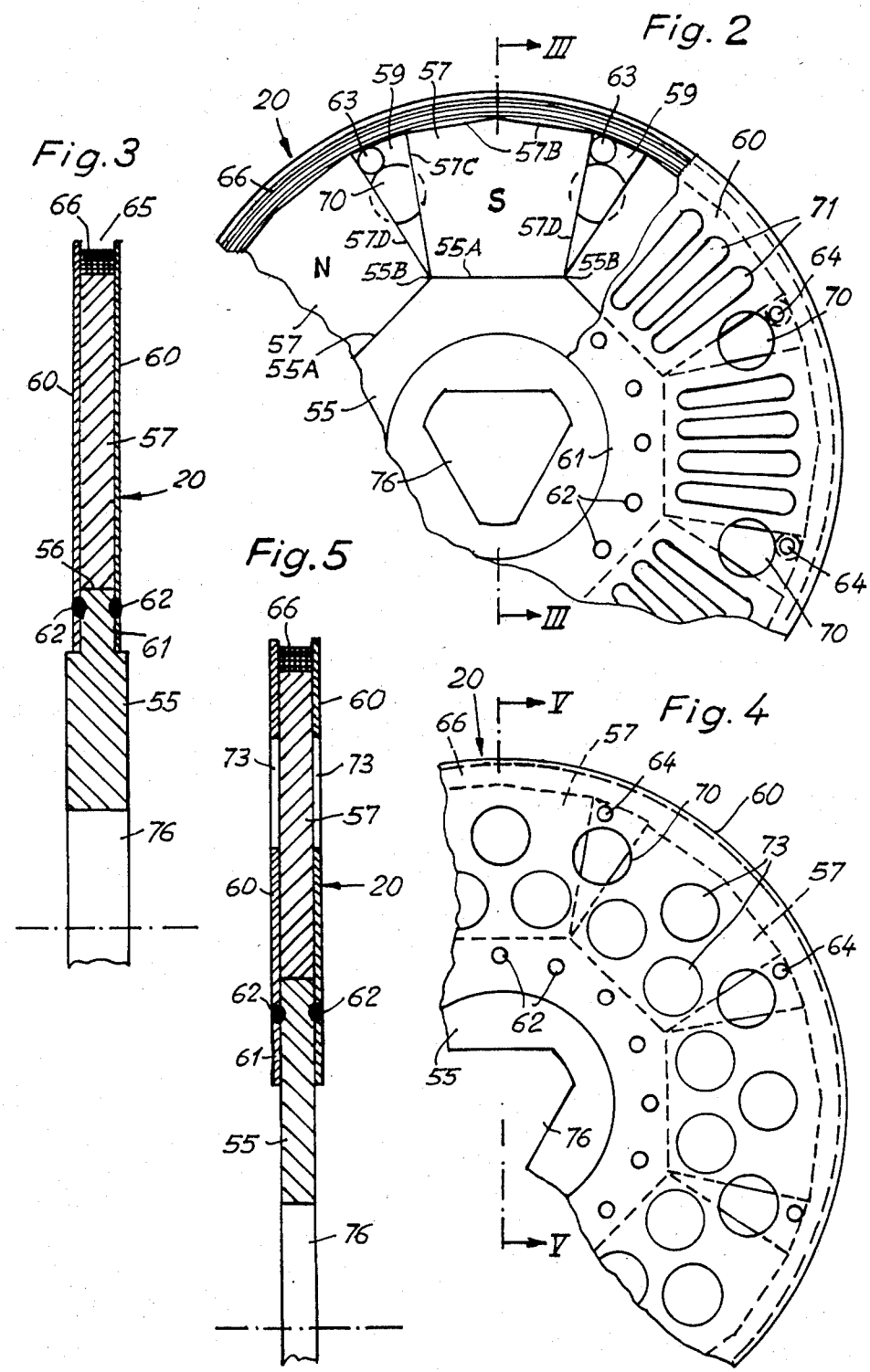

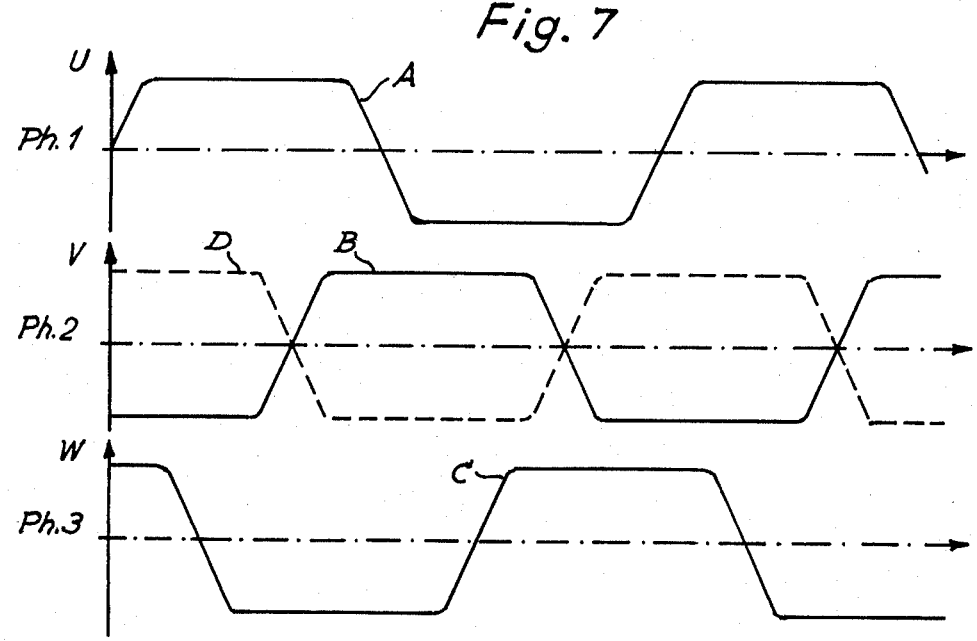
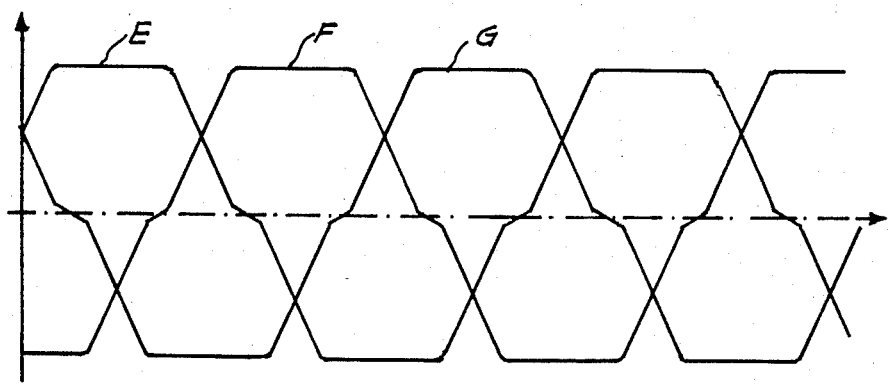
Fig. 7

ALTERNATING CURRENT SYNCHRONOUS SERVOMOTOR

The present invention relates to an alternating current synchronous servomotor of the kind at which a disk-shaped rotor is located between two stator halves of which each is provided with a bearing for a shaft supporting the rotor and comprise each a magnetiron part having a plurality of radial grooves and an electrical coil having leads inserted in the radial grooves which rotor comprises an even number of flat permanent magnet parts having magnet field lines extending parallel to the shaft, which pemanent magnet parts form an annular like series including interstices extending around a hub supported on the shaft and of a magnetically not conductive material and have that sides acting as magnetic pole surfaces which extend in parallel planes to which the axis of the shaft extend, perpendicularly and are serially alternating north and south poles, and whereby the interstices between adjacent permanent magnet parts diverge radially towards the outside.

A motor with a rotor of the described design is known e.g. from a Japanese patent application according to the publication IP-A 53-116 410 (1978). It, however, encompasses obviously a motor having a relatively low output e.g. for the drive of the capstan shaft of a portable cassette tape recorder apparatus.

The invention is based on the object to provide a alternating current synchronous servomotor which can be designed specifically for the output range from 50 W to 50 kW and can generate an accordingly high torque, which motor is to incorporate a relative short axial dimension and in comparison with known servo-motors a higher efficiency and lower weight per unit of output. The servo-motor to be provided shall, furthermore, be designed such that its rotor can follow with as little as possible delay the electrical alternating current impulses given to the stator windings and which are e.g. provided by a machine controlled static converser. Accordingly, the rotor shall feature a relatively low mass and the winding of each stator half shall incorporate a compact volume such that the electrical inductivity remains as small as possible. It is also an object of the invention to design the servo motor such that its rotor is as much as possible free from any reluctance in order to allow a smooth rotary motion of the rotor also at exemely low r.p.m.'s and low loads.

These objects are solved by the inventive alternating current synchronous servomotor of which the decisive design features are defined in the appended claims.

Particulars and advantages of the invention follow from the following description of exemplary embodiments of the inventive motor and the corresponding drawings, which are to serve for explaining the invention as examples only.

FIG. 1 illustrates an axial section through an alternating current synchronous servomotor according to the invention;

FIG. 2 discloses a part of the rotor of the servomotor according to FIG. 1 viewed in the direction of the axis, whereby the cover plate facing the viewer is partly broken away;

FIG. 3 is an axial partial section according to line III—III in FIG. 2, shown on an enlarged scale;

FIG. 4 illustrates a somewhat different embodiment of the rotor in a partial illustration and viewed in direction of the shaft;

FIG. 5 is an axial partial section according to line V—V in FIG. 4 shown on an enlarged scale;

FIG. 7 illustrates a plurality of diagrams for illustrating the performance relative to time of the induced electrical voltage in a three-phase motor according to the invention;

FIG. 9 is an analogne voltage-vector diagram for the suitably interconnected windings of the two stator halves of the three-phase motor to which FIG. 8 refers to.

Figure 1:
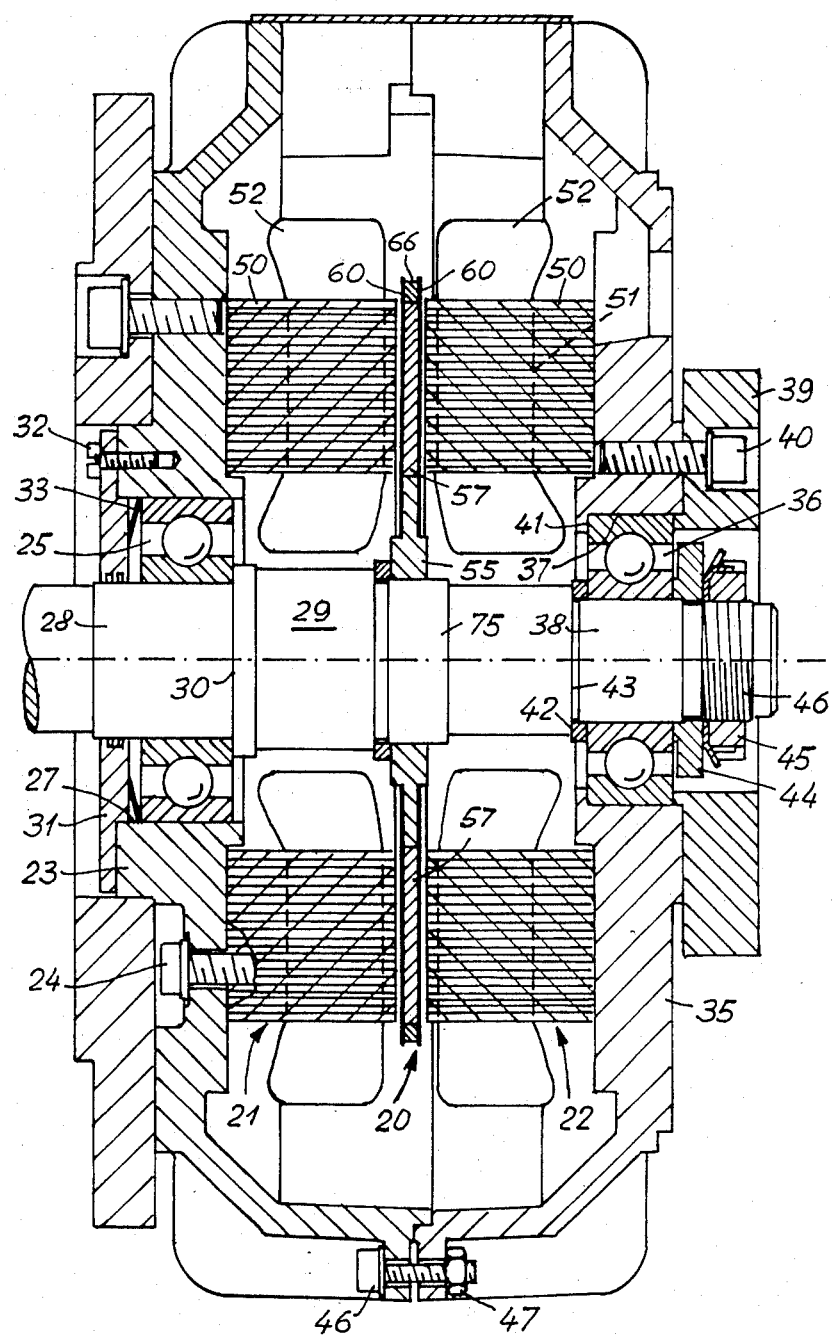

The alternating current synchronous servomotor illustrated in FIG. 1 comprises a disk-shaped rotor 20 and two stator halves 21 and 22 between which the rotor 20 is located. The end of the one stator half 21 facing away from the rotor 20 is supported on a casing part 23 and mounted by the agency of screw bolts 24 of which one only can be seen. The outer race of a ball bearing 25 sits in a bore 27 of the casing part 23 while the inner race of this ball bearing sits on an end portion 28 of reduced diameter of the shaft 29 supporting the rotor 20 and rests against a shoulder 30 of this shaft. An annular disk 31 is mounted to the outer side of the casing portion 23 by means of screw bolts 32. An annular disk spring 33 is arranged between this annular disk 31 and the outer race of the ball bearing 33.

The axial end of the other stator half 22 facing away from the rotor 20 is supported on a casing part 35 and mounted to the casing part 35 by not illustrated screw bolts. The outer race of a second ball bearing 36 sits in a bore 37 of the casing part 35. The inner race of this ball bearing 36 sits on an end section 38 of reduced diameter of a shaft 29 supporting the rotor. An annular disk 39 is mounted to the casing portion by means of screw bolts 40. The outer race of the ball bearing 36 is pressed by this annular disk 39 against a shoulder 41 on the casing part 35 and accordingly arrested against a displacement in axial direction. A thrust transmitting ring 42 is inserted between the inner race of the ball bearing and a shoulder 43 of the shaft 29. A further thrust transmitting ring 44 is located at the opposite side of the ball bearing 36, which is pressed by means of a nut 45 against the inner race of the ball bearing 36. The nut 45 is screwed on a threaded part 46 of shaft 29.

The two casing parts 23 and 35 which enclose together the rotor 20 and the two stator halves 21 and 22 are interconnected by means of screw bolts 46 and nuts 47 of which only one each is illustrated in FIG. 1.

Each of the stator halves 21 and 22 comprises a ring-shaped magnetiron part 50 which is suitably wound from a web material. A plurality of radial grooves 51 which are open against the rotor 50 are arranged in each magnet iron part 50, of which every one extends from the inner circumferential edge to the outer circumferential edge of the magnet-iron part. The leads of an electric coil 52 are inserted in the radial grooves 51 of each magnet iron part 50. The coils 52 of the two stator halves 21 and 22 are interconnected electrically such as will be explained later.

The rotor 20 comprises a hub 55 mounted rigidly on the shaft 29 and having an annular shape and a small axial dimension relative to its outer diameter. The hub 55 consists of a magnetically non-conductive material, e.g. of a Cr-Ni-Steel or Titanium. According to FIGS. 2 and 3 the outer periphery of the hub 55 is formed by flat planes 55 A which extend along the sides of a regular polygon having an even number of corners. In the illustrated embodiment the outer periphery of the hub 55 comprises eight flat planes 55 A and the same number of intermediate corners 55 B. On each of the flat peripheral planes 55 A of the hub 55 there is supported a flat limiting plane 55 A of a permanent magnet part 57 and mounted by means of a bonding agent, e.g. a two-component bonding means. The permanent magnet pieces 57 are flat plates having roughly a trapezoidal shape such as clearly viewable in FIG. 2. The radially outer limiting plane 57 B of every permanent magnet piece is either bent roof-top like, such as illustrated in FIG. 2 or bulged along a circular line extending around the axis of the rotor 20.

Interstices 59 are freely left between permanent magnet pieces 57 following each other in an annular serial arrangement. Preferably, the permanent magnet pieces 57 are made of a rare earth material and magnetized laterally, such that the magnet field lines extend perpendicularly to the roughly trapezoidal flat sides of each permanent magnet piece which act as pole surfaces N and S and thus extend parallel to the axis of the shaft 29. The adjoining permanent magnet pieces 57 are oppositely magnetized such that at each side of the rotor 20 magnetic north and south poles succeed each other. Preferably, all permanent magnet pieces 57 are produced with a same shape and size and magnetized unidirectionally prior to be mounted on the hub 55 in alternatively by 180° changed orientation.

Figure 6:
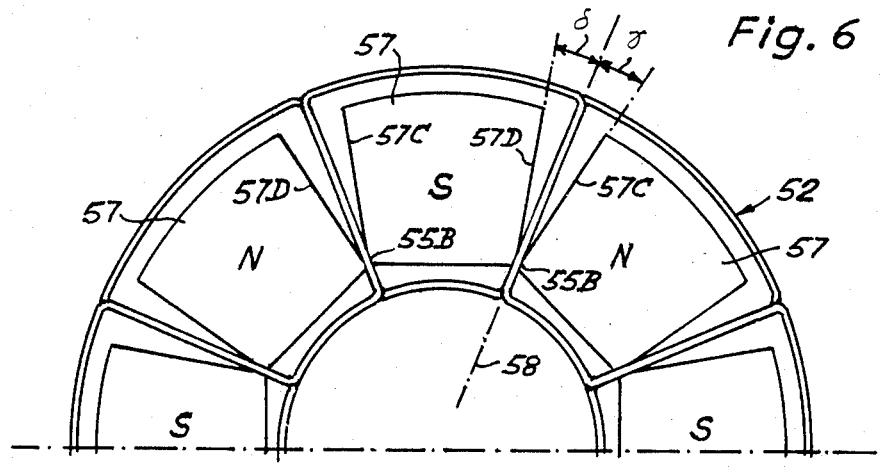
FIG. 6 is a schematic illustration, similar to FIG. 2, for illustrating the design and arrangement of the permanent magnet pole surfaces of the rotor relativ to the electric winding for one phase in one stator half.

The adjoining permanent magnet pieces 57 comprise limiting surfaces 57C and 57 D facing ech other, between which a respective one of the previously mentioned interstices 59 is present. Two respective facing limiting surfaces 57C and 57D of the adjoining permanent magnet pieces 57 contact each other at a location where an edge 55B of the hub 55 is located. From the point of contact the facing limiting surfaces 57C and 57D diverge against the outer circumference ot the rotor 20 such that each of the interstices 59 between adjoining permanent magnet pieces 57 has a wedge-like shape such as clearly can be seen in FIG. 2. FIG. 6 discloses further, the two respective facing limiting surfaces 57 are oppositely inclined at an acute angle or resp. relative to an imaginary plane 58 which contains the edge 55B at the location of contact of the limiting surfaces 57C and 57 D and can, upon a corresponding rotational position of the rotor 20, be aligned with longitudinal direction of each groove 51 in the magnetic iron part 50 of the stator half 21 and 22, resp. In case the grooves 51 extend precisely radially relative to the axis of the shaft 29, the plane 58 will also extend radially relative to the axis of the shaft.

Preferably, the angles and are of the same magnitude, and they have a size in the range of 5° to 20°, at an eight pole motor preferably about 15°. By means of this design it is arrived at that the magnetic flux proceeding from each magnetic pole surface N and S is taken up completely between two coil sides 52A and 52B of the coil 52 belonging together and may be utilized practically without any interruptions at the polarity change locations of the magnetic flux, which substantially aids to a relatively high efficiency and that the reluctance of the rotor 20, i.e. action of the grooves upon rotating the rotor is reduced due to the inclined extent of the limiting surfaces 57C and 57D of the permanent magnet pieces relativ to the direction of the coil sides 52A, 52B.

The flat sides of all permanent magnet pieces 57 extending in two parallel planes are coated by two parallel, annular shaped cover disks 60 of a magnetically non-conductive material, e.g. a Cr-Ni-Steel or Titanium and bonded to these cover plates by a bonding agent, e.g. a two-component bonding agent. The inner circumferential edge part 61 of each cover plate 61 grips around the hub 55 and is mounted thereto by spot welds 62. Close to the outer circumference of the cover plates 60 an axial distance piece 63 is located in each interstice 59 between the two cover plates and connected to latter by spot welds 64. The outer circumferential edge part of each cover plate 60 extends in radial direction beyond the outer limiting surfaces 57B of the permanent magnet pieces 57 such taht a peripheral channel 65 is formed thereat. An elastic bandage 66 made of a magnetically non-conductive material, preferably a glass-fibre material is located in the peripheral channel 65 and is envelopping the permanent magnet pieces 67. The object of the bandage 66 is to securely have the permanet magnet pieces 57 with their radially inner limiting surfaces 57A also at high rotational speeds abutting the planar peripheral sides 55A of the hub 55 and accordingly to lock the permanent magnet pieces 57 in a form-locked manner rotationally rigid with the hub 55 in order to have a safe transmittal at the mechanical torques from the permanent magnet pieces on to the hub.

The two cover plates 60 are provided with a plurality of openings 70 which are aligned with the interstices 59 between the permanent magnet pieces 57. These openings 70 and the interstices 59 form windows at the rotor 20 into which if necessary pieces of material for balancing the rotor 20 can be inserted or bonded thereto by means of a bonding agent. If the cover plates 60 consist, as mentioned, of a metallic material the are suitably provided with additional, e.g. slot like opeings 71 which aid for damping eddy currents in the cover plates and additionally aid in reducing the mass of the rotor 20.

If measured in direction of the axis of rotation of the rotor 20 the thickness of the cover plates 60 is small relativ to the thickness of the permanent magnet pieces 57 measured in the same direction, which thickness is in turn little if compared with the outer diameter of the rotor 20. If the outer diameter of the rotor amounts to e.g. about 130 mm the thickness of the permanent magnet pieces 57 if measured in axial direction amounts to e.g. 3,2 to 4,0 mm, and whereby the thickness of each cover plate 60 amounts to e.g. 0,2 to 0,3 mm. It is obvious that such a rotor, which in additiion comprises no specific heavier ferromagnetic material at all, has a relatively low mass and accordingly is burdened with a corresponding low inertia of mass. Therefore, the rotor can be accelerated and decelarated realtively fast due to the travelling magnet fields generated in the stator halves 21 and 22 by the coils 52, such that between the momentaneous magnetic fields of the stator halves 21 and 22 at the one hand and the respectively corresponding rotational position of the rotor 20 a small time delay is present. In other words: the described rotor 20 is in a position to adjust specifically speedily its roatational movements to changes in frequency of the alternating current feeding the stator coils 57.

The two cover plates 60 and the bandage 66 produce not only a increased mechanical rigidity of the rotor 20, but act additionally as protection of the relatively easly damageable rareearth-permanent magnet pieces 57 by foreign bodies which can penetrate in between the air gap between the rotor 20 and the magnet iron parts 50 of the stator halves 21 and 22.

The hub 55 of the rotor 20 is suitably placed on a non-circular section 75 of the shaft 29 and is provided to this end with central opening 76 which is shaped correspondingly to the cross-section of the shaft section 75. It is, however, also possible to design the shaft section 75 and the opening 76 circularly and to mount the hub 55 to the shaft section 75 by means of a press-fit.

The embodiment of the rotor 20 illustrated in FIG. 4 and 5 differs from such of FIG. 2 and 3 whereby by a somewhat different shape of the hub 55 and by differently shaped and arranged openings 73 in the cover plates 60.

If a motor of the described kind and as illustrated in FIGS. 1 to 6 is provided with a three-phase winding induced voltages are present in operation in each stator half 21, 22 such as shown in FIG. 7. The curves A, B, and C illustrate the magnitude relative to time of the induced voltages U, V and W in the three phase windings. The broken line curve D corresponds to curve B with opposite symbols and, accordingly, represent the voltage −V. The curve E represents the arithmetic sum U−V, the curve F the arithmetic sum V−W and the curve G the arithmetic sum W−U. It can be seen, that at each respective change of polarity or passing of the curves E, F and G through D zero practically no dead zone is produced in which the voltage amounts to zero during a markable time span. This advantageous effect is based on the fact that the respective adjoining permanent magnet pieces 57 contact each other respectively at an edge 55B of the hub 55. The limiting surfaces 57C and 57D which are inclined at opposite angles and generate the inclined rising and similarly inclined dropping flanks of the voltage curves A to G. From the curves E, F and G it can be derived that all positive half-waves complete each other to a practically constant sum which corresponds to a positive direct voltage of which the magnitude corresponds to the amplitude of each positive half-wave.

The analogue is true for the negative half-waves which complete each other also to a practically constant sum. This means, that for the feeding of the coils of the described motor ideally a three-phase current having a voltage characteristic corresponding roughly to one of the curves E, F and G is suitable, which three-phase current may be derived from an e.g. machine controlled static generator. Because each of the curves E, F and G does not deviate to far from a sinus shape it is also possible without drawback to feed the coils of the motor by sinus-shaped phase rotating current. Moreover, it is possible to achieve by a relatively small change of the shape of the permanent magnet pieces 57 that the curves E, F and G attain a rather exact sinus-shaped form such that in such case the motor is specifically suitable for a feeding by a sinus-shaped three-phase current.

It already has been mentioned, that due to the inclination of the mutually facing limiting surfaces 57 C and 57 D of the permanent magnet pieces 57 by the angles and the influencing dependency of the grooves of the motor 20 is reduced. For many applications, however, a yet larger reduction of the reluctance of the rotor is desired, such that a continuous operation of the rotor and thus smooth operation of the motor is possible also at extremely low rotational speeds and low load. This can be adchieved by one of the following measures:

One of the measures of reducing the reluctance of the motor is to choose the number of nuts 51 in each magnet-iron part 50 of the two stator halfs to be k.p.m ±1, whereby k is an integral number, p the number of phases in the stator windings and m the number of permanent magnet pieces 57 of the rotor. If e.g. such as shown in FIGS. 2 and 4 the rotor comprise totally permanent magnet pieces 57 and the windings 52 of the stator halves 21 and 22 are so-called one-hole-coils, the magnet iron pieces are suitably provided with 25 grooves 51 each.

A further measure of decreasing the reluctance of the motor is to choose the number of grooves 51 in each magnet iron part 50—as usual—to be k.p.m., whereby k, p, and m have the meaning as set forth above, but to arrange the grooves, singularly or group-wise at unequal angular distances.

Figure 8:
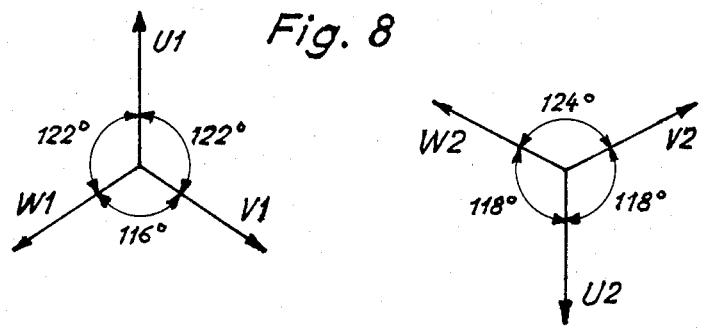
FIG. 8 is a voltage-vector diagram of an inventive three-phase motor having a number of grooves not dividable by three.
Figure 9:
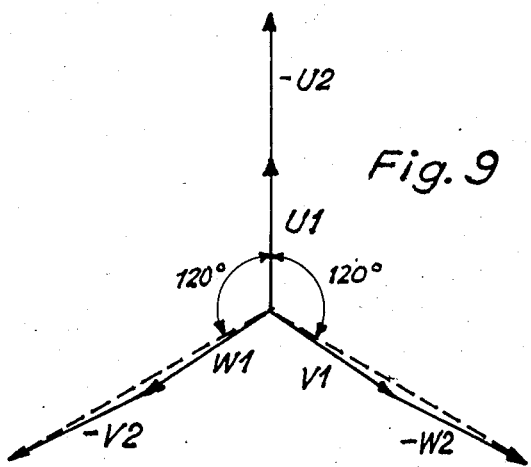

In both described cases voltage vectors are produced for each stator half 21, 22 which do not enclose same angles. In FIG. 8 at the left side the voltage vectors U 1, V 1 and W 1 of a threephase winding of the one stator half 21 are illustrated whereby it has been assumed, that 25 grooves are present in the magnetiron part and the rotor comprises eight permanent magnet pieces (k=1; p=8; m=3; k.p.m ×1=25). The angles between the voltage vectors amount to about 122°, 116° and 122° instead of 120° each. The analogue is true for the other stator half 22, the voltage vectors U 2, V 2 and W 2 of which enclose angles of about 118°, 124° and 118°. This unsymmetric condition of the angles can be compensated practically completely in that suitable phase windings of the stator half 21 and of the other stator half 22 are connected in series with opposite poles. Thereby the vector diagram illustrated in FIG. 9 is produced, according to which the voltage vectors U 1 and −U 2, V 1 and −2, and W 1 and −V 2 are added, respectively. The voltage vectors resulting together for the two stator halves enclose together angles of almost exactly 120°.

The same effect can be achieved also if the winding 52 of each single stator half 21 and 22, respectively is divided for each phase into two partial windings, which are arranged in radial grooves 51 of the magnet iron part 50 such and interconnected in series such that the sought compensation of the unsymmetry of the partial windings results therefrom.

Yet a further measure for reducing the reluctance of the motor is to design the permanent magnet pieces 57 of the rotor 20 variably and/or to distribute them unevenly in the circumferential direction of the rotor. The number of grooves 51 in each magnet iron part 50 of the stator halves 21 and 22 can amout—as usual—to be k.p.m, whereby k, p and m have the above mentioned meaning.

Finally, it also is possible for a reduction of the reluctance of the motor, at an equal distribution of same permanent magnet pieces 57 and at k.p.m grooves 51 in the magnet iron parts 50 to merely rotate the one stator half 21 relative to the other stator half 22 by half a groove division. The effect achieved thereby is, however, not as good as at the previously explained measures.

I claim:
1. Alternating-current-synchonous-servomotor having a disk-shaped rotor (20) which is located between two stator halves (21, 22) of which each is provided with a bearing (25, 36) for a shaft (29) supporting the rotor and comprise each a magnet iron part (507 having a plurality of radial grooves (51) and an electrical coil (52) having leads inserted in the radial grooves, which rotor (20) comprises an even number of flat permanent magnets part (57) having magnet field lines extending parallel to the shaft (29), which permanent magnet parts (57) form an annular like series including interstices (59) extending around a hub (55) supported on the shaft and of a magnetically unconductive material and have flat sides acting as magnetic pole surfaces (N, S) which extend in parallel planes to which the axis of the shaft (29) extend perpendicularly and are serially alternating north and south poles, and whereby the interstices (59) between adjacent permanent magnet parts (57) diverge radially towards the outside, characterized in that the outer periphery of the hub (55) comprises flat planes (55 A) extending along the sides of a regular polygon and edges (55 B) located therebetween, and the permanent magnet pieces (57) have flat limiting surfaces (57 A) located radially inwards, which are supported each on one of the flat peripheral planes (55 A) of the hub (55), and in that a bandage (66) extending in the circumferential direction of the motor (50) and made of a magnetically non-conductive material are located around radially outwards located limiting planes (57 B) of the permanent magnet pieces (57), by means of which bandage (66) the permanent magnet pieces are held in abutment with the hub (55) and accordingly are connected form-locked to the hub (55) and rotationally locked therewith, and that the adjoining permanent magnet pieces (57) have mutually facing limiting planes (57 C, 57 D), which contact each other practically at the edges (55 B) between the flat peripheral planes (56) of the hub (55) and diverse relative to the direction of a radial groove (51) of the magnet iron part (50) of one of the stator halves (21, 22) which is aligned with the location of contact (55 B) oppositely inclined against the radially outer circumference of the rotor (20).

2. Motor of claim 1, characterized in that the series of permanent magnet pieces (57) is located between two annular cover plates (60) of magnetically nonconductive material, which cover plates (60) about the flat sides (N, S) of the permanent magnet pieces (57) acting as magnet poles and are mounted by their inner circumferential sections (61) to the hub (55).

3. Motor of claim 2, characterized in that the permanent magnet pieces (57) are connected to the periphery of the hub (55) and to the cover plates (60) by means of an adhesive agent.

4. Motor of claim 2, characterized in that in the interstices (59) between adjacent permanent magnet pieces (57) a respective at least one axial distance piece (63) is located between the cover plates (60) which is connected to each of the cover disks (60).

5. Motor of claim 2, characterized in that at least one of the cover disks (60) is provided with a plurality of openings (70,71), of which at least a part (70) is aligned with the interstices (59) between adjoining permanent magnet pieces (57), whereby windows for mounting balancing material are formed at the rotor (20).

6. Motor of claim 1, characterized in that the permanent magnet pieces (57) consist mainly of rare earth material.

7. Motor of claim 1, characterized in that the rotor (20) comprises m same and equally distributed permanent magnet pieces (57) and each stator half (21, 22) a magnet iron portion (50) with k.p.m. ±1 equally distributed grooves (51), whereby k means an integral number, m an even number and p the number of phases of every stator winding (52).

8. Motor of claim 1, characterized in that the rotor (20) comprises in same and equally distributed permanent magnet pieces (57) and the magnet iron portion (50) of each stator half (21,22) comprise k.p.m. unequally distributed grooves (51), whereby k means an integral number, m an even number and p the number of phases of each stator winding (52).

9. Motor of claim 7, characterized in that for the compensation of the electrical unsymmetry of the coil of each stator half (21, 22) suitable parts of the coils (52) of the one or the other stator half (21, 22) having opposite pole conditions are connected in series 10. Motor of claim 7, characterized in that the coil (52) of each stator half (21, 22) is divided into at least two differing partial coils which are arranged in the radial grooves (51) of the magnet iron portion (50) such and are interconnected such that the electrical unsymmetries of the partial coils are compensated practically completely.

11. Motor of claim 1, characterized in that the rotor (20) comprises m unequal or unequally distributed permanent magnet pieces (57) and the magnet iron portion (50) of each stator half (21, 22) comprises k.p.m equally distributed grooves (51), whereby k means an integral number, m an even number and p the number of phases of each stator winding (50).

* * * * *